United States Patent Office 3,001,679
Patented Sept. 26, 1961

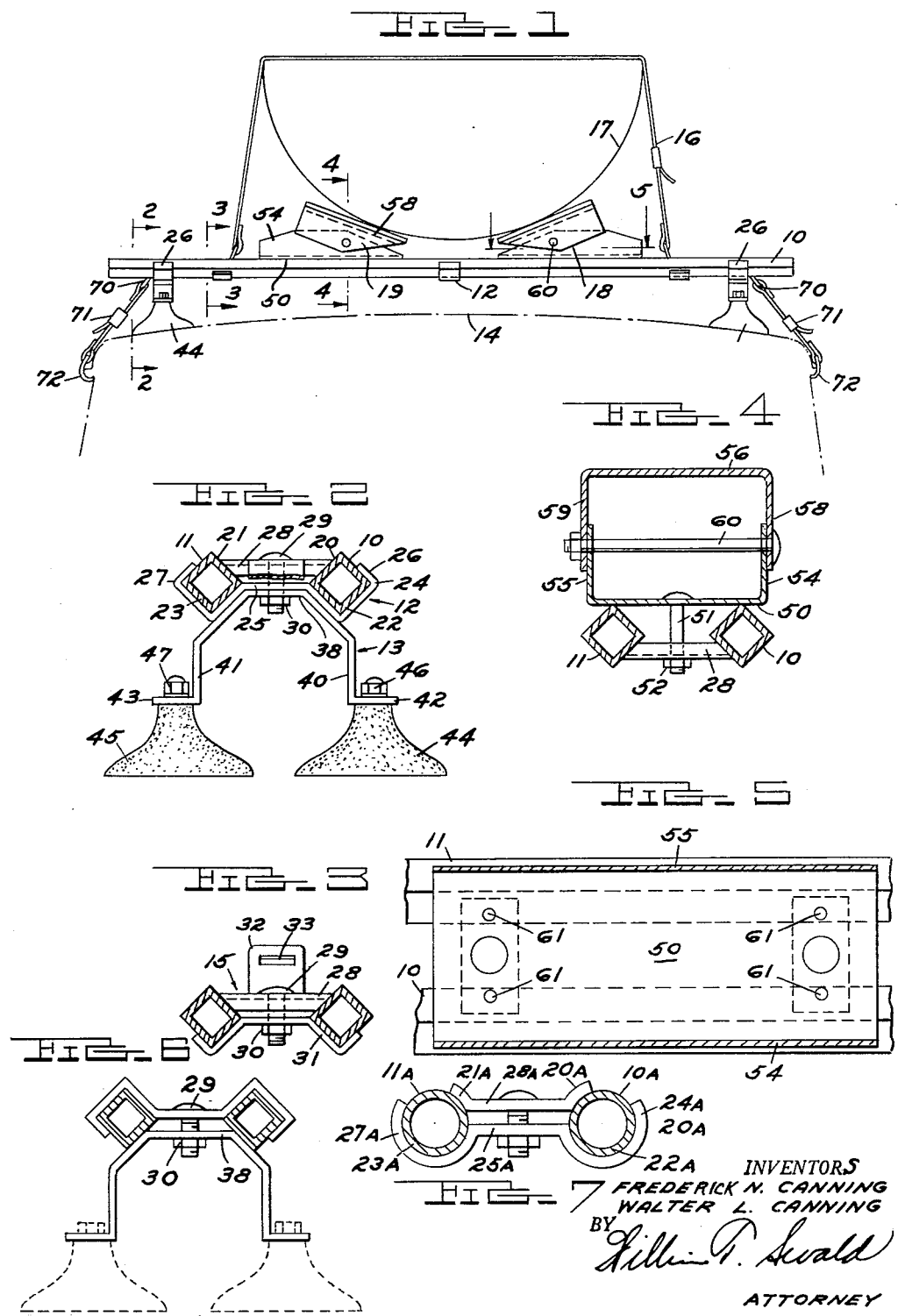

3,001,679
CAR TOP CARRIER
Frederick N. Canning, 1121 Puritan Drive, and Walter L. Canning, 550 N. Glenhurst Drive, both of Birmingham, Mich.
Filed June 10, 1959, Ser. No. 819,366
7 Claims. (Cl. 224—42.1)

This invention relates to load supporting devices and more particularly pertains to a rack and blocks for securing and positioning loads on a vehicle deck.

Car top luggage racks have been employed heretofore to facilitate the supporting of loads on a vehicle, however, the several devices of the prior art have not proven entirely satisfactory inasmuch as they are inadequate in design and construction, improperly adjustable and securable, and unsatisfactory in use.

With the foregoing in view, the primary object of the invention is to provide a deck load rack which is adequate in design and construction, properly securable and adjustable to both the deck and the load, and which has means for positively securing the device in its adjusted position relative to both the supporting vehicle and the supported load so as to be highly satisfactory in use.

An object of the invention is to provide a luggage or load rack which is inexpensively manufactured, has the component parts which are easily made and the assembly parts readily accomplished with substantially duplicate parts being employed throughout to reduce component structures.

An object of the invention is to provide spaced parallel bars positioned and interconnected by the easily adjustable positive clamping means.

An object of the invention is to provide clamping means including a confining clamp portion and a jamming clamp portion adapted to securely connect the bars together with the clamps being easily adjustable longitudinally of the bars.

An object of the invention is to provide leg portions having a span member nestable with or constituting one of the clamp portions which is easily annexed to the bars and clamps by the same interconnecting bolts.

An object of the invention is to provide rocking load block singly or in combination with the inventive rack which automatically adjusts itself relative to the contour of the load in supporting and confining relationship thereto.

An object of the invention is to provide intermediate clamps easily adjustable longitudinally of the bars for supporting rigging attachments for fastening the load to the rack.

These and other objects of the invention will become apparent by reference to the following description of a load rack and blocks embodying the invention taken in connection with the accompanying drawing in which:

FIG. 1 is a side elevational view of the inventive rack and load blocks mounted on a vehicle showing the vehicle portion in dotted lines.

FIG. 2 is a cross sectional view of the device seen in FIG. 1 taken on the line 2—2 thereof.

FIG. 3 is a cross sectional view of the device of FIG. 1 taken on the line of 3—3 thereof.

FIG. 4 is a cross sectional view of the device seen in FIG. 1 taken on the line 4—4 thereof.

FIG. 5 is a cross sectional view of the block seen in FIG. 1 taken on the line 5—5 thereof.

FIG. 6 is a view similar to FIG. 2 showing a modification; and

FIG. 7 is a view similar to FIG. 3 showing a modification.

Referring now to the drawing wherein like numerals refer to like and corresponding parts throughout the several views, the load rack and blocks disclosed therein to illustrate the invention comprises, spaced parallel bars preferably interconnected adjacent their ends and center by primary clamping means 12, supports 13 locating the bars 10 and 11 above the vehicle deck 14, and secondary clamping means 15 intermediate the bar ends for attachment to rigging straps 16 for holding down the load 17 which is supported as illustrated by the rocking blocks 18 and 19.

More particularly the spaced parallel bars 10 and 11 may be square, or rectangular in cross section as seen in FIG. 2 or round as seen in FIG. 7 at 10a and 11a and the bars have opposite ends and opposed adjacent inner sides 20, 21, 20a, and 21a presenting opposed cam surfaces toward each other and remote outer sides 22, 23, 22a and 23a; the primary clamps 12 comprise a first confining portion 24 consisting of an intermediate spanning portion 25 and 25a and rod outer side enveloping hooked portion 26, 27, 24a, and 27a which hold the bars 10 and 11 sidewise-inwardly and a second jamming clamp portion 28, 28a, which abuts the inner sides 20 and 21 at either camming end of the clamp second portion urging the bars sidewise outwardly in opposition to the first confining clamp portion; the confining and jamming clamp portions have aligned apertures receiving the bolt 29 which leads therethrough and engages the nut 30 and upon the nut and bolt being tightened the confining and jamming portions are drawn toward one another clamping the bars 10 and 11 therebetween. By loosening the nut 30 on the bolt 29, the clamping relationship is relaxed so that the primary clamps 12 can be endwise adjusted relative to the bars as desired.

The secondary clamp portions 15 comprise a confining clamp portion 31, a jamming clamp portion 28, a bolt 29, a nut 30, and an extending bracket 32 having an aperture 33 therein for receiving the rigging tie down strap 16.

The supports comprise a span 30 nesting with the confining clamp portion and having an aperture receiving the bolt 29 therein and includes depending legs 40 and 41 terminating in feet 42 and 43 which are connected to the rubber suction pads 44 and 45 via the cap nuts 46 and 47.

Referring to the modification of FIG. 6 it will be noted that the confining clamp portion is oppositely disposed to the device seen in FIG. 2 and that the support span portion 38 is used for the double purpose of supporting the legs 40 and 41 and acting as the jamming clamp portion so that upon drawing the nut 30 and the bolt 29 the bars are securely held between the confining clamp portion and the jamming span portion 38 of the support. It is to be noted in FIG. 7 that due to the annular shape of the bars that the jamming clamp and confining clamp portions are provided with arcuate bars engaging portions for closely overlying to the bar surfaces.

Referring to the rocking blocks of FIGS. 1, 4, and 5, each block comprises a bottom plate 50 lying on the bars 10 and 11 or other supporting surface and equipped with an aperture for receiving the bolt 51, or other type fastener such as a nail, and in the embodiment illustrated the jamming clamp portion 28 is disposed in opposition to the plate 50 and interconnected by the bolt 51 and nut 52 to fasten the plate 50 on the bars 10 and 11. The plate 50 terminates upwardly in spaced parallel upstanding flanges 54 and 55 and the top plate 56 is disposed in spaced relationship above the bottom plate 50 and has depending flanges 58 and 59 in spaced parallel relationship and in nesting relationship with the flanges 54 and 55 with all the flanges having aligned apertures receiving the pin or bolt 60 rockably mounting the top plate 56 on the bottom plate 50 and it is to be noted that the pin 60 is disposed intermediate the end of the plates 50 and 56 so that the plate 56 can be rocked about the pivot pin 60 relative to the bottom plate 50. The bottom plate 50 when used on the rack is preferably equipped with additional side apertures 61 permitting the bolt 51 to be selectively placed therein to angulate the plate 50 sidewise relative to the bars 10 and 11 so as to adjust the face of the top plate 56 to any compound angle of the load 17 so that the face of the plate 56 is substantially parallel to the load surface at the point of contact.

In operation, the user places the rack on the vehicle deck 14 and loosens the nut 30 and then adjusts the primary clamps 12 and supports 13 endwise of the bars so as to properly locate the supports 13 and cups 44 and 45 relative to the vehicle deck 14 surface and then the nuts 30 are tightened on the bolts 29 firmly locating the clamps and supports in the desired position and the primary clamps 12 are provided with tangs 70 connecting to the hold down straps 71 which are equipped with hooks 72 for engaging the bottom side of the vehicle drain molding or other abutment for holding the rack downwardly on the vehicle.

The user then loosens the nuts and bolts on the secondary clamps and moves them sidewise outwardly and he adjusts the blocks sidewise outwardly and then places the load 17 on the bars 10 and 11; he then moves the secondary clamps to the desired position and tightens the nuts and bolts securing them in place and then places the blocks at their proper position and tightens the nuts 51 and bolts 52 securing the blocks in their proper position whereupon the rigging ties 16 are secured firmly holding the load in the desired position.

The inventive rack and load blocks with these features constitutes a compact, durable, and neat appearing mechanism which is easily operated and positively secured.

Although but a single embodiment of the invention with a few modifications have been shown and described in detail, it is obvious that many changes may be made in the size, shape, detail, and arrangement of the various elements of the invention within the scope of the appended claims.

We claim:

1. A rack for supporting and securing deck loads such as on automobile tops comprising paired spaced parallel horizontal bars having opposite ends and having opposed adjacent inner sides and remote outer sides, paired first clamp portions transversely disposed across said bars intermediate the ends thereof; said first clamp portions having hooked outer ends at least partially enveloping said bars' outer sides providing an outer abutment preventing sidewise outer movement of said bars, paired second clamp portions transversely disposed across said bars in opposition to said first clamp portions; said second clamp portions having outer camming ends contacting said bars' inner sides providing an inner abutment preventing sidewise inner movement of said bars; both said first and said second clamp portions having aligned apertures in their area between said bars, a bolt disposed between both said clamp portions lying in said apertures, a nut on said bolt; said bolt and nut forceably drawing both said clamp portions toward one another with said second clamp portions' ends camming said bars against first clamp portions' ends to lock said bars therebetween; and supports on said rack positioning said rods above a supporting surface; both said clamp portions being longitudinally adjustable on said rods by loosening and tightening said nuts and bolts.

2. In a device as set forth in claim 1, said supports comprising span portions nested in said clamp portions having an aperture receiving said bolt attaching said span portions to said device, and depending leg portions on either end of said span portions.

3. In a device as set forth in claim 1, said second clamp portion also constituting said support span portion, paired legs depending from said jamming clamp portion, and feet on said legs.

4. In a device as set forth in claim 1, intermediate clamp combinations longitudinally adjustably disposed on said rods each comprising a confining clamp portion, a jamming clamp portion, a nut and bolt drawing said portions together, and rigging hold down means on one said clamp portion.

5. In a device as set forth in claim 1, paired rocking load blocks lying on the top of said bars each comprising a bottom plate lying on the top of said bars, spaced parallel upstanding flanges on said plate, a top plate spaced over said bottom plate, spaced parallel depending flanges on said top plate nesting with the upstanding flanges of said bottom plate; all said flanges having aligned apertures, a pin through the apertures of said flanges pivotally connecting said flanges and plates; said bottom plate having an aperture; a bolt leading through said aperture between said rods, a clamp portion on said bolt engaging said rods at their bottoms, on a nut on said bolt drawing said plate and clamp portion together securing said block on said rods; said top plate being rockable relative to a load such as a boat hull placed thereagainst to automatically adjust itself in supporting substantially parallel abutting relationship thereto.

6. In a device as set forth in claim 5, said bottom plates having multiple apertures laterally of said bolt receiving aperture for selectably receiving said bolt so as to dispose said plate selectably angularly to said bars to locate said top plate at the desired angle relative to a load.

7. In a device as set forth in claim 6, said bottom plate having two sets of sidewise spaced apertures for angularly disposing said plate relative to said bars and for securing said plate at either end to said bars.

References Cited in the file of this patent

UNITED STATES PATENTS

| | | |
|---|---|---|
| 429,357 | McBee | June 3, 1890 |
| 2,584,292 | Rogers | Feb. 5, 1952 |
| 2,596,860 | McCrory et al. | May 13, 1952 |
| 2,766,897 | Alker | Oct. 16, 1956 |
| 2,795,388 | Myers | June 11, 1957 |
| 2,798,625 | Mamo | July 9, 1957 |
| 2,888,178 | Olson | May 26, 1959 |
| 2,901,201 | Taylor et al. | Aug. 25, 1959 |